United States Patent
Reitan et al.

(10) Patent No.: US 6,966,580 B2
(45) Date of Patent: Nov. 22, 2005

(54) DEVICE FOR ALLOWING ADJUSTMENT OF THE POSITION OF A STEERING MEMBER IN A VEHICLE

(75) Inventors: Hege Reitan, Gralum (NO); Lars Andersen, Rolvsoy (NO); Tomas Skeppström, Sodertalje (SE)

(73) Assignee: Scania CV AB (publ) (SE)

( * ) Notice: Subject to any disclaimer, the term of this patent is extended or adjusted under 35 U.S.C. 154(b) by 160 days.

(21) Appl. No.: 10/296,023

(22) PCT Filed: May 31, 2001

(86) PCT No.: PCT/SE01/01225
§ 371 (c)(1),
(2), (4) Date: Nov. 20, 2002

(87) PCT Pub. No.: WO01/92083
PCT Pub. Date: Dec. 6, 2001

(65) Prior Publication Data
US 2004/0012184 A1 Jan. 22, 2004

(30) Foreign Application Priority Data
Jun. 2, 2000 (SE) ............................................. 0002075

(51) Int. Cl.⁷ .................................................. B62D 1/18
(52) U.S. Cl. ........................................ 280/775; 74/493
(58) Field of Search .............................. 280/775, 778; 74/492, 493

(56) References Cited

U.S. PATENT DOCUMENTS

| | | | |
|---|---|---|---|
| 3,799,569 A | * 3/1974 | Baker | 280/775 |
| 4,463,626 A | * 8/1984 | Kazaoka et al. | 74/493 |
| 4,537,089 A | 8/1985 | Moneta | 79/493 |
| 4,793,204 A | * 12/1988 | Kubasiak | 74/493 |
| 5,035,446 A | 7/1991 | Arvidsson | 280/775 |
| 5,168,768 A | 12/1992 | Easton | 74/493 |

FOREIGN PATENT DOCUMENTS

DE 3328283 2/1985

\* cited by examiner

*Primary Examiner*—Paul N. Dickson
(74) *Attorney, Agent, or Firm*—Ostrolenk, Faber, Gerb & Soffen, LLP

(57) ABSTRACT

A device for allowing adjustment of the angular position of a steering member, like a steering wheel in a vehicle. An upper portion of the device is connected to the steering member. A lower portion is supported in the vehicle. A connection between the upper and lower portions permits pivoting of the upper portion along a curved path with respect to the lower portion, enabling adjustment of the steering member to a plurality of angular positions relative to the lower portion. The center of curvature of the curved path is located between the steering member and the driver in the approximate vicinity of the wrist of the driver.

14 Claims, 4 Drawing Sheets

DEVICE FOR ALLOWING ADJUSTMENT OF THE POSITION OF A STEERING MEMBER IN A VEHICLE

BACKGROUND OF THE INVENTION AND PRIOR ART

The present invention relates to a device for allowing adjustment of the position of a steering member in a vehicle according to the preamble of claim 1 along a curved path, e.g. tilt adjustment.

Known devices for adjusting the position of the steering members, as steering wheels, in motor vehicles comprise usually a mechanism, which allows a position adjustment of the steering wheel at least vertically. After a driver has performed such an adjustment of the steering wheel, the risk exists that it blocks important instruments in the instrument panel. In many cases, the driver has therefore to make a compromise between a comfortable driving position and a clear view of important instruments in the instrument panel.

SE 457 871 shows a device in a vehicle which allows an automatic adjustment of the position of a steering wheel during operation of the vehicle. The steering wheel is attached to an upper part of the device, which is articulately provided in relation to a lower part, via a joint. The joint is located a distance behind the steering wheel in relation to the driver. A changed angular adjustment of the steering wheel results in this case also in an adjustment of the position of the steering wheel vertically. Therefore, a completely variable adjustment of the steering wheel may not be obtained by this device.

U.S. Pat. No. 4,537,089 shows a device which allows adjustment of a steering wheel in different angular positions. The steering wheel is attached to the device at an upper portion, which is displaceably provided in relation to a lower portion along a curved path. The steering wheel is here possible to displace along the curved path, which has a centre of curvature located relatively far away from the steering wheel and near the driver. Also here, a changed angular adjustment of the steering wheel is associated with a vertically changed adjustment of the steering wheel. A completely optimal adjustment adapted to the individual driver may therefore not either be obtained by this device.

SUMMARY OF THE INVENTION

The object of the present invention Is to provide a device for adjustment of the position of a steering member in a vehicle, which device allows a substantially arbitrary angular adjustment of the steering member starting from a first adjustment of the steering member adapted to the driver.

This object is achieved by the device of the initially mentioned kind. An optimally adapted position of a steering member for a driver comprises a correct adjustment of the steering member vertically and a correct adjustment of the distance between the driver and the steering member. After a driver has adjusted the steering member to such a position al-lowing a comfortable driving position, the steering member may in certain cases wholly or partly block important instruments provided in the instrument panel. Since the steering member is possible to set in different angles around a center of curvature, which is located ahead of the steering member and at a distance from 1 to 10 cm from a plane extending through the grip areas of the steering member, said center of curvature will be located at or in immediate vicinity of the wrist of the driver. Thereby, the driver may substantially with a simple movement of the wrist, turn the steering member to a desired position for the driver where important instruments are not blocked. Since the movement of the wrist is executed by the wrist in a substantially fixed position, the driver may keep his comfortable posture during and after such an adjustment of the position of the steering member.

According to a preferred embodiment of the present invention, said center of curvature is located at a distance from 4 to 7 cm from said plane extending through the grip areas of the steering member. Normally, the distance from a fulcrum of a wrist of a person to a center grip point in the hand is about 6 cm. How-ever, the wrist is usually held somewhat angled when the steering member is gripped such the distance from the wrist to said plane is somewhat less than 6 cm for an ordinary person when the steering member is gripped. By providing a center of curvature at a distance from 4 to 7 cm from said plane, there is substantially no movements of the wrists for the most drivers during an angular adjustment of the steering member. If the steering member is a steering wheel having an annularly extended grip surface, the center of curvature is provided above the part of the grip surface of the steering wheel which is the most natural to grip for the driver.

According to another preferred embodiment of the present invention, anyone of said lower portion and upper portion of the device comprises the curved path whereas the other portion comprises at least a position member which is arranged to be displaceable along said curved path. The position member may be adjustable in a continuous manner along said curved path such that a continuous angular adjustment of the steering member is obtained or be adjustable in advanced determined fixed positions along the curved path. Advantageously, a first curved path comprises a first upper surface and a second curved path a second lower surface and that at least a first position member is arranged to be displaceable along the first upper surface and at least a second position member is arranged to be displaceable along the second lower surface. Since the curved paths comprise an upper surface and a lower surface having position members which are provided in contact with the respective surfaces, a stable control may be obtained between the upper portion and the lower portion when they are angularly adjusted in relation to each other.

According to another preferred embodiment of the present invention, at least anyone of said first position member and second position member comprises a body having a surface, which is slideably provided along said first surface or a said second surface. Advantageously, such a body has in the contact surface with the curved path a corresponding curved shape. According to an alternative, at least anyone of said first position member and said second position member may comprise a wheel member which is rollably provided along said first surface or said second surface. By the wheel member, a very low friction between the wheel member and the surface of the curved path is obtained during such a displacement motion. Said wheel member and said surface may comprise co-operating gears. Thereby, a stable contact between the upper portion and the lower portion is obtained and the risk for a skew setting of the position members along the curved path is eliminated.

According to another preferred embodiment of the present invention, the lower portion is attachable to a second adjusting device, which allows adjustment of the lower portion in a plurality of positions. By such an adjusting device, the steering member initially may be placed in a position adapted to the individual driver. Thereafter, the driver may turn the steering member in a desired angular position by means of a wrist motion without changing his adjusted driving position in the vehicle.

According to another preferred embodiment of the present invention, the upper portion comprises a passage through which a steering shaft, which is connected to the steering member, is arranged to extend. In order to transmit the turned position of the steering member to the steerable wheels of the vehicle said steering shaft is used, which extends down through the upper portion. Advantageously the steering member is a steering wheel. Usually, steering wheels are used as steering members in vehicles and they have a construction, which in many cases blocks parts of the instrument panel.

BRIEF DESCRIPTION OF THE DRAWINGS

In the following is described as an example a preferred embodiment of the invention with reference to the attached drawings, in which.

DETAILED DESCRIPTION OF A PREFERRED EMBODIMENT OF THE PRESENT INVENTION

Figure 1:
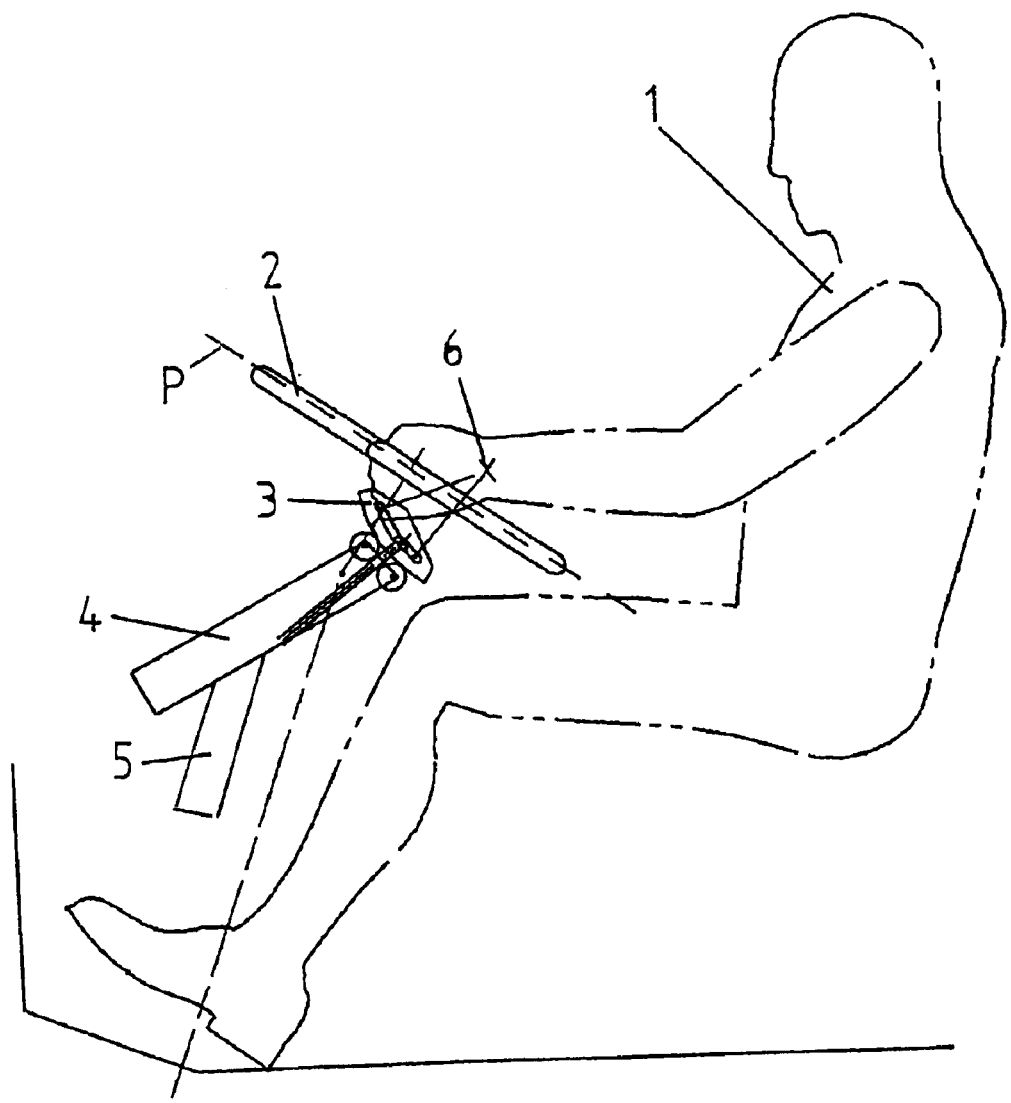
FIG. 1 shows schematically a device according to the present invention for adjusting the angular adjustment of a steering wheel.

FIG. 1 shows a driver 1, which is arranged to steer a vehicle by a steering member in form of a steering wheel 2. A device for al-lowing adjustment of the angular position of the steering wheel 2 comprises an upper portion 3, which is fixedly provided in relation to the steering wheel 2, and a lower portion 4, which is adjustable in different positions vertically by a second adjusting device 5. The second adjusting device 5 is shown schematically in FIG. 1. The upper portion 3 is connected to the lower portion 4 along two curved paths. The upper portion 3 and thereby the steering wheel 2 may be adjusted in different angles in relation to the lower portion 4 by said curved paths. The curved paths have a corresponding curvature having a center of curvature 6, which is located on the opposite side of the device for allowing adjustment of the angular position of the steering wheel 2. Said center of curvature 6 is arranged to coincide with or to be located at as small a distance as possible from a fulcrum of the wrist of the driver 1. Such a center of curvature 6 is defined by an axis having a perpendicular extension to a plane (p), which is shown in FIG. 1. Said plane (p) extends through the natural grip areas of the driver on the grip surface of the steering wheel 2. The steering wheel 2 has a substantially annular grip surface, which extends and is pivotable around a fulcrum. The center of curvature 6 is located above the natural grip areas of the steering wheel 2, i.e. at a distance from said plane (p). In private cars, the natural grip areas on the steering wheel are located about 60° from the highest located point of the steering wheel 2 and in heavy vehicles located somewhat more than 90° from the highest located point of the steering wheel 2. Since persons in a normal case have a distance from the fulcrum of the wrist to a grip point in the hand of about 6 cm, it is suitable to provide said center of curvature 6 at a distance from 4 to 7 cm from the natural grip areas of the steering wheel 2.

Figure 2:
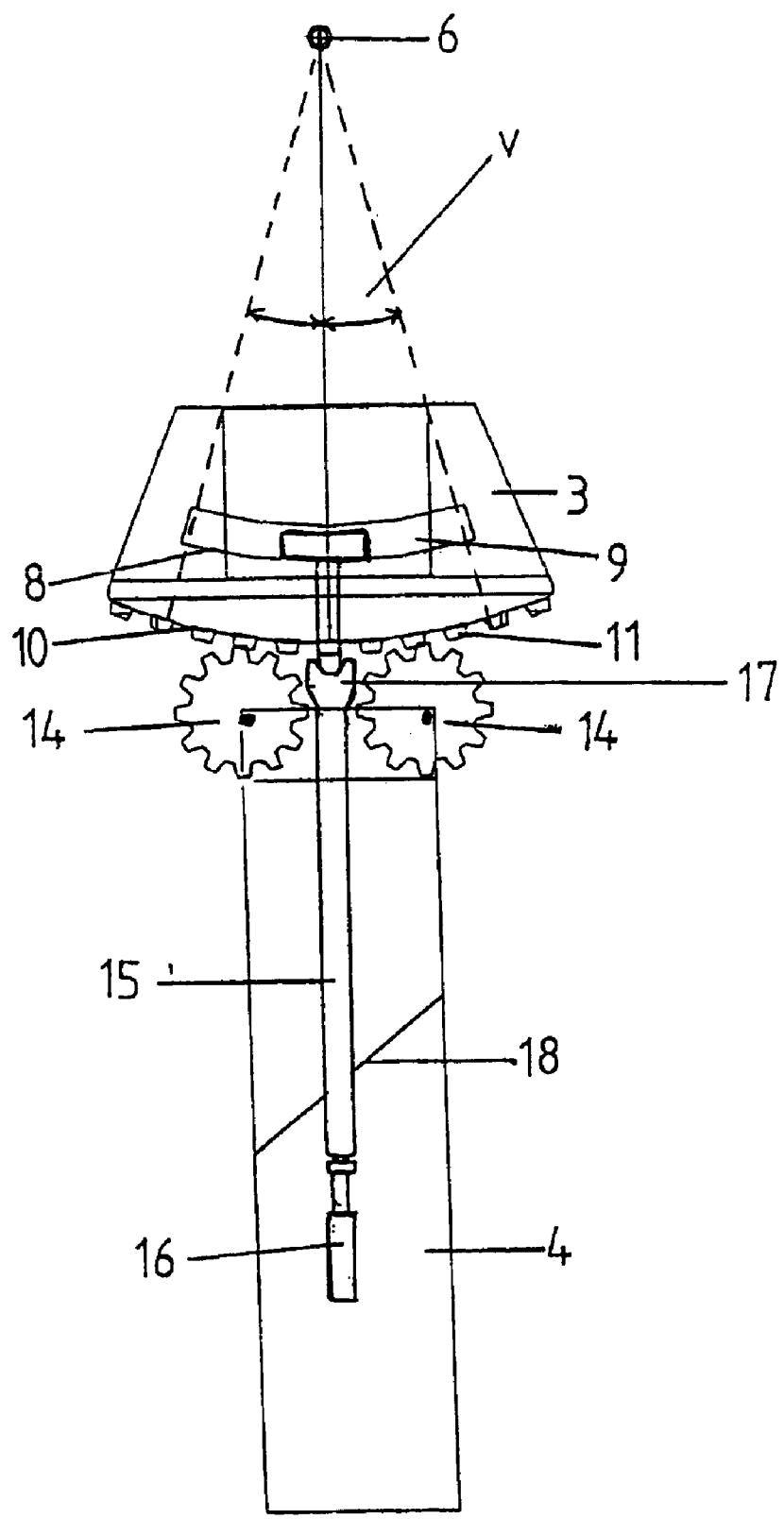
FIG. 2 shows the device in FIG. 1 more in detail seen from the side.
Figure 3:
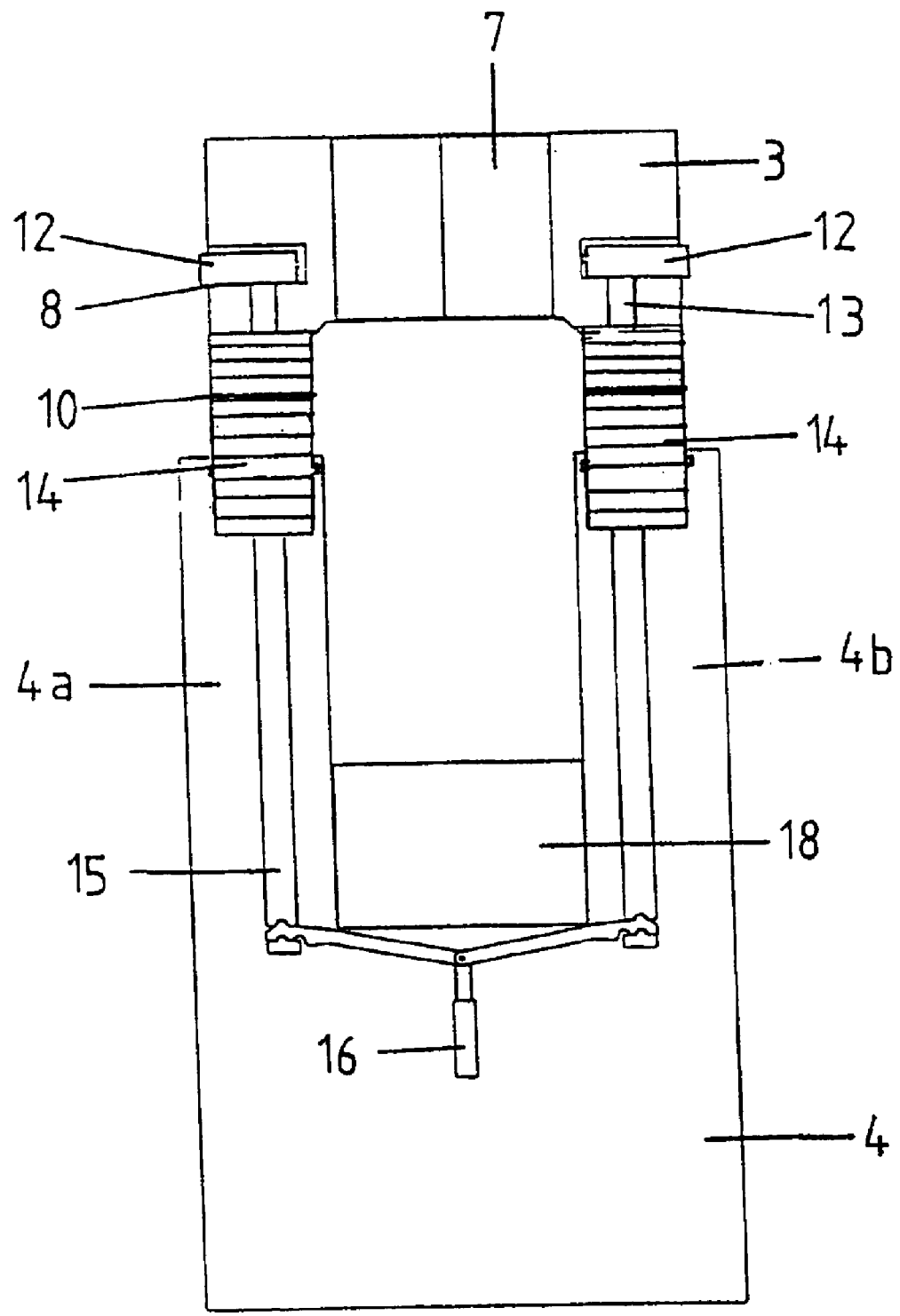
FIG. 3 shows the device in FIG. 2 seen from the front.

FIGS. 2 and 3 show the device in FIG. 1 more in detail. Hereby, it is evident that the upper portion 3 comprises a passage 7 through which a steering shaft, which is connected to the steering wheel 2, is arranged to extent. Suitable attachment means are provided for attachment of the steering wheel 2 to the upper portion 3. However, these attachment means are not shown in the figures. The upper portion 3 comprises a first curved path having an upper curved surface 8 which constitutes a part of a curved recess 9 and a second curved path comprising a lower surface 10 which comprises a plurality of gears 11. The upper curved surface 8 and the lower curved surface 10 have a corresponding curvature such they have a common centre of curvature 6. The upper portion 3 comprises such curved paths at each of its side surfaces. The lower portion 4 comprises substantially two leg-shaped portions 4a, b, which extent upwards to the upper portion 3. Each of the leg-shaped portions 4a, b comprises at an upper end a position member in form of a slide element 12, which is provided on a protruding rod 13. The slide elements 12 are displaceably provided in the curved recesses 9 and slideably provided along the upper curved surface 8. Consequently, the lower portion 4 comprises totally two slide elements 12. Each of the leg-shaped portions 4a, 4b, comprises at its upper end also position members in form of two gear wheels 14. Consequently, the lower portion 4 comprises totally four gear wheels 14. The gear wheels 14 are arranged to roll along the lower curved surface 10 which comprises gears 11 of a corresponding size. By means of the position members 12,14, the upper portion 3 and the lower portion 4 are guided along the curved paths in relation to each other. Since the position members 12, 14 are connected to the lower portion 4 at the upper curved surface 8 as well as at the lower curved surface 9 of the upper portion 3, a stable guiding of the upper 3 and the lower portions 4 is obtained where they are angle adjusted in relation to each other. The curved recess 9 comprises end portions, which restrict the motions of the slide elements 12 along the upper curved surface 8. Thereby, these end portions restrict the maximum angle v, which may be obtained between the upper portion 3 and the lower portion 4.

Figure 4:
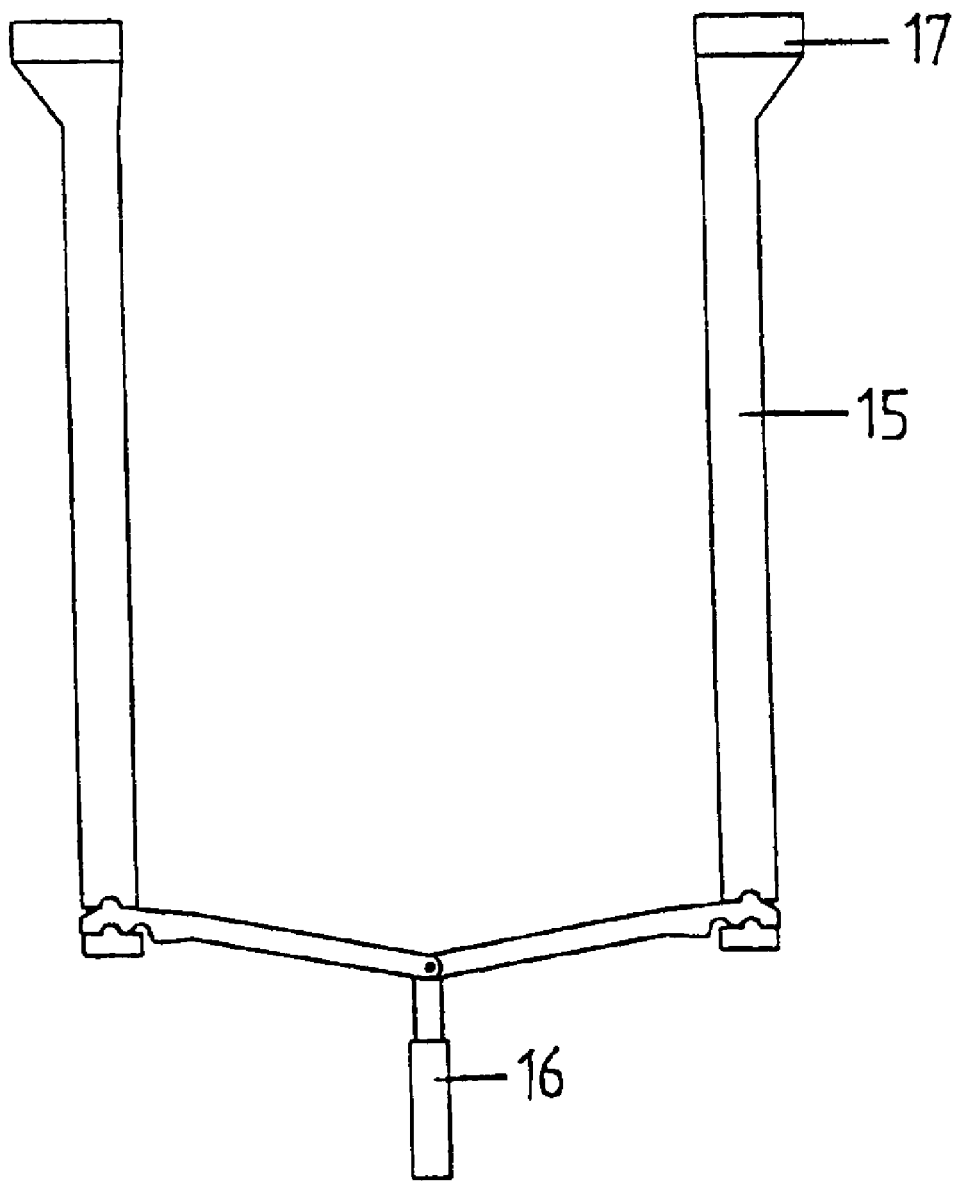
FIG. 4 shows a lock mechanism for allowing locking of the steering member in a desired angular position.

In order to lock the upper portion 3 in relation to the lower portion 4 in an adjusted angular position, a locking device is provided. The locking device is shown separately in FIG. 4 and it comprises a linked mechanism 15, which is loaded in an upward direction by a gas spring 16. The linked mechanism 15 extents up through the leg-shaped portions 4a,b of the lower portion 4 between the gear wheels 14 and is ended by an end portion 17, which comprises a recess having a corresponding shape as the gears 11 of the lower curved surface 10. The end portion 17 is pressed upwards by a force produced by the gas spring 16 such it receives and keeps the nearest located gear 11 in its recess. Thereby, the upper portions 3 and the lower portions 4 are lockable in relation to each other in a substantially arbitrary adjusted angular position.

The lower portion 4 comprises an inclined surface 18 between the leg-shaped portions 4a,b of the lower portion 4. This surface 18 is arranged to abut to a corresponding incline surface of the second adjusting device 5. These inclined surfaces are arranged to be displaceable in relation to each other such the lower portion may be adjusted vertically. The second adjusting device 5 also comprises a lock mechanism in order to allow locking of the surface 18 in relation to the corresponding surface of the second adjusting device 5 in a plurality of positions. Consequently, the second adjusting device 5 allows an adjustment of the steering wheel 2 vertically in a desired position for the driver.

Initially, when a driver has to use a vehicle, the position of the steering wheel 2 is adjusted when need arises by the second adjusting device 5 such the steering wheel 2 obtains a desired vertical position for the driver. If, for example, the steering wheel 2 in this position blocks important instruments in the instrument panel or if the driver by any other reason desires to set the steering wheel 2 in another angle, the driver grips the normally intended gripped surface of the steering wheel 2 with at least one hand. Thereafter, the driver displaces the linked mechanism 15 downwardly with, for example, the other hand by a suitable control member against the action of the gas spring 16. The end portion 17 also is displaced downwardly and its locking of the received gear 11 is discontinued. Since the upper curved surfaces 8 and the lower curved surfaces 10, along which the slide elements 12 and the gear wheels 13 are displaceable, have a curvature which forms a center of curvature 6 in or in immediate vicinity of a fulcrum of the wrist of the driver 1, the driver 1 may with a simple movement of the wrist now turn the steering wheel 2 to a desired angular position. Consequently, the driver 1 may retain his present comfortable driving position independently of the angular position of the steering wheel 2. After the adjustment of the steering wheel to a desired angular position, the driver release the control machining and the gas spring 16 again displaces the linked mechanism 15 and the end portion 17 upwards to a locked position of the now nearest located gear 11.

The present invention is not in any way restricted to the above-described embodiments in the drawings but may be modified freely within the scope of the claims. For example, the described lock mechanism is not necessary to use but a functional lock mechanism of a substantially arbitrary kind may be used.

What is claimed is:

1. A device for allowing adjustment of the position of a steering member in a vehicle, wherein the steering member comprises a body having at least two grip areas spaced a distance from each other so as to be grippable by hands of a driver of the vehicle, the steering member being so shaped and the grip areas being so placed that the grip areas have an extension substantially along a plane extending through the grip areas;
    the device for allowing adjustment comprising:
    an upper portion connected to the steering member, a lower portion connected to the vehicle; a steering member guidance device connecting the upper and lower portions so that the steering member is adjustable into at least two different angle positions in relation to the lower portion along a curved path with respect to the lower portion;
    a locking device operable to lock the upper portion in relation to the lower portion at a selected angle position;
    the curved path with respect to the lower portion has a curvature with a center of curvature of the curved path located on the side of the plane extending through the grip areas that is away from the lower portion of the device and spaced at a distance of between 1 to 10 cm from the plane.

2. The device of claim 1, wherein the center of curvature is spaced at a distance of from 4 to 7 cm from the plane.

3. The device of claim 1, wherein the curved path is defined on one of the upper and lower portions and the other of the upper and lower portions has a position member thereon connected with and moveable along the curved path for enabling the upper portion to move along the curved path with respect to the lower portion.

4. The device of claim 3, wherein the curved path has a first curved path part and a second curved path part on the same axis as the first curved path part and radially spaced apart, the first curved path part comprises a first surface, the second curved path part comprises a second surface; the position member comprises a first position member supported to be moveable along the first surface and a second position member supported to be moveable along the second surface.

5. The device of claim 3, wherein the first and second surfaces are directed radially opposite each other and the first and second position members act in opposition to each other against the respective ones of the first and second surfaces, supporting and guiding the movement of the upper portion with respect to the lower portion.

6. The device of claim 1, wherein at least one of the first position member and the second position member comprises a body having a sliding surface which is slidable along the respective one of the first and the second surfaces at which the respective ones of the first and second position members is disposed.

7. The device of claim 6, wherein at least one of the first and second position members comprises a wheel which is rollable along the respective one of the first and second surfaces.

8. The device of claim 4, wherein at least one of the first and second position members comprises a wheel which is rollable along the respective one of the first and second surfaces.

9. The device of claim 8, wherein the locking device is operable to lock the wheel against rotation.

10. The device of claim 8, wherein the wheel comprises a gear and the surface on which the wheel is rollable comprises a cooperating gear.

11. The device of claim 1, further comprising a second adjusting device to which the lower portion is attached, the second adjusting device allowing positioning of the lower portion in a plurality of positions with respect to the vehicle.

12. The device of claim 1, wherein the upper portion includes a passage, a vehicle steering shaft connecting with the steering member and the steering shaft extending through the passage of the upper portion.

13. The device of claim 1, wherein the steering member comprises a steering wheel.

14. A device for allowing adjustment of the position of a steering member in a vehicle, wherein the steering member comprises a body having at least two grip areas spaced a distance from each other so as to be grippable by hands of a driver of the vehicle, the steering member being so shaped and the grip areas being so placed that the grip areas have an extension substantially along a plane extending through the grip areas;
    the device for allowing adjustment comprising:
    an upper portion connected to the steering member, a lower portion connected to the vehicle; a steering member guidance device connecting the upper and lower portions so that the steering member is adjustable into at least two different angle positions in relation to the lower portion along a curved path with respect to the lower portion;
    a locking device operable to lock the upper portion in relation to the lower portion at a selected angle position;
    the curved path with respect to the lower portion has a curvature with a center of curvature of the curved path located on the side of the plane extending through the grip areas that is away from the lower portion of the device and is located in the approximate vicinity of the wrist position of the driver; and further comprising a second adjusting device to which the lower portion is attached, the second adjusting device allowing positioning of the lower portion in a plurality of positions with respect to the vehicle.

* * * * *